United States Patent [19]

Delaney et al.

[11] 4,065,444

[45] Dec. 27, 1977

[54] GRAFT COPOLYMER ON BUTADIENE-PIPERYLENE ELASTOMER

[75] Inventors: Edward A. Delaney, Woodbury, Conn.; Norman J. Pinkowski, St. Louis, Mo.; Walter Nudenberg, Newtown, Conn.

[73] Assignee: Uniroyal, Inc., New York, N.Y.

[21] Appl. No.: 609,458

[22] Filed: Sept. 2, 1975

Related U.S. Application Data

[62] Division of Ser. No. 454,992, March 25, 1974, abandoned.

[51] Int. Cl.$^2$ .................. C08F 279/04; C08F 36/06
[52] U.S. Cl. ...................... 260/880 R; 152/330 R; 260/879; 260/881; 526/159; 526/337
[58] Field of Search .................. 260/880 R, 879, 881

[56] References Cited

U.S. PATENT DOCUMENTS

| 2,802,808 | 8/1957 | Hayes | 260/45.5 |
| 3,862,274 | 1/1975 | Moberly | 260/879 |

FOREIGN PATENT DOCUMENTS

| 163,755 | 1964 | U.S.S.R. | 260/82.1 |

OTHER PUBLICATIONS

Chem. Abst., 61, 16285(b), 1964.

*Primary Examiner*—Christopher A. Henderson, Jr.
*Attorney, Agent, or Firm*—James J. Long

[57] ABSTRACT

Elastomeric butadiene-piperylene copolymers in which the butadiene is mainly in high cis-1,4-addition, low vinyl configuration, prepared in solution using iodine-containing catalyst based on organomagnesium compound and titanium tetrahalide. Graft copolymers of resin-forming monomers (e.g., styrene, acrylonitrile) on the butadiene-piperylene elastomer have good low temperature impact strength.

2 Claims, No Drawings

GRAFT COPOLYMER ON BUTADIENE-PIPERYLENE ELASTOMER

This is a division of application Ser. No. 454,992, filed Mar. 25, 1974, now abandoned.

This invention relates to an elastomeric copolymer and method of making the same, and to a graft copolymer on said elastomeric copolymer.

The invention provides novel elastomeric copolymers of butadiene-1,3 and pentadiene-1,3, also known as piperylene. More specifically, the invention relates to butadiene-piperylene elastomeric copolymers in which the butadiene portion is found in a high cis-1,4-addition, low vinyl configuration. These novel copolymers contain from about 5 to about 80 weight percent of piperylene and from about 95 to about 20 weight percent of butadiene. The invention is also directed to a process for preparing these novel high cis-1,4-addition butadiene elastomeric butadiene-piperylene copolymers in solution using iodine-containing catalyst based on an organomagnesium compound and a titanium tetrahalide. The invention is furthermore concerned with gum plastic compositions based on such novel butadiene-piperylene elastomers, particularly graft copolymers of resin-forming monomers (e.g., styrene and acrylonitrile) on the novel butadiene-piperylene elastomer.

The novel rubbery butadiene-piperylene copolymers of the invention contain a high percentage, e.g., at least 70%, butadiene of cis-1,4-addition and less than 10% of 1,2-addition, and are definitely elastomeric at room temperature.

These new copolymers are characterized by exceptionally good mill behavior and are millable at higher temperatures (e.g., up to 150° F) than conventional high cis-1,4-polybutadiene, - the degree of improvement increasing with increasing piperylene content. As indicated above, a major portion of the butadiene units of the present copolymers is in the cis-1,4-configuration and this factor renders them processable at elevated processing temperatures and very suitable for applications requiring high rebound at temperatures below room temperature, low hysteresis, high abrasion resistance and low $T_g$ ($-109°$ to $-100°$ C) or where low temperature service is a major requirement.

The piperylene content in the copolymers of the invention is between 5 and 80 weight percent and preferably between 7 and 40 weight percent. Conversely, the butadiene content is between 95 and 20 weight percent and preferably between 93 and 60 weight percent.

Infra-red analyses of the butadiene-piperylene copolymers confirm the fact that the butadiene units in the copolymer are largely in the cis-1,4-configuration, e.g., more than 70% of the double bonds are in the cis-1,4-configuration while less than 10%, and usually less than 5%, of the double bonds are in the vinyl-1,2-configuration.

Through the use of Nuclear Magnetic Resonance we have been able to establish the presence of -1,4, -1,2 or -3,4 pentadiene units in our copolymer. However further quantitative breakdown of the structure into cis and trans composition has not been attained because of the complexity of the system attributed to further stereo isomerism, sequential distribution and butadiene isomerism present in the structure. The pentadiene units are, however incorporated into the copolymer in the approximate ratio of 1,4/1,2 = 2.

Our novel copolymers lack crystalline melting points as judged by Differential Thermal Analyses thus indicating a random placement of the piperylene in our copolymer without the formation of ordered piperylene units due to isotactic or syndiotactic placement of piperylene units. According to a purely qualitative infra-red analysis of the piperylene portion of our copolymers there is the indication that the piperylene units are found to be mainly in the cis-1,4 or cis-1,2 form with somewhat less of the trans-1,4. Very little trans-1,2 is present while the vinyl-3,4 is essentially negligible. Also, the copolymers described herein are essentially amorphous in character.

Our unique copolymers are prepared by contacting a mixture of butadiene and piperylene in an inert solvent with a catalyst system based on an organomagnesium compound and a titanium tetrahalide.

The organomagnesium compounds used in the process of this invention correspond to the general formulas RMgX and R$_2$Mg (or mixtures thereof), wherein X is halogen (chlorine, iodine, bromine or fluorine), and R is a hydrocarbyl radical containing 1–30 carbon atoms. The titanium tetrahalide component is represented by the general formula TiX$_4$ wherein X is defined as in the organomagnesium compound but may represent the same or combinations of different halogen atoms.

The organomagnesium compounds usable in the process of this invention are exemplified by the following: dodecyl magnesium iodide, dodecyl magnesium bromide, decyl magnesium iodide, stearyl magnesium iodide, ethyl magnesium iodide, methyl magnesium iodide, methyl magnesium chloride, myristyl magnesium bromide, nonyl magnesium iodide, nonyl magnesium fluoride, naphthyl magnesium bromide, phenyl magnesium bromide, phenyl magnesium chloride, ethyl magnesium chloride, hexyl magnesium iodide, 2-ethylhexyl magnesium bromide, methyl cyclohexyl magnesium iodide, p-tertiary butyl benzyl magnesium iodide, hexadecyl magnesium chloride, cetyl magnesium fluoride, didodecyl magnesium, didecyl magnesium, distearyl magnesium, diethyl magnesium, dimethyl magnesium, dimyristyl magnesium, dinonyl magnesium, dinaphthyl magnesium, diphenyl magnesium, dihexyl magnesium, di-2-ethyl-hexyl magnesium, dimethylcyclohexyl magnesium, di-p-tertiary butyl benzyl magnesium, dihexadecyl magnesium and dicetyl magnesium.

The titanium tetrahalide employed in this invention is exemplified by the following: titanium tetraiodide, titanium tetrabromide, titanium tetrachloride, titanium tetrafluoride and mixed titanium tetrahalides such as titanium dichloride diiodide, titanium dibromide diiodide and titanium monobromide triiodide. The titanium iodides are preferably used when preparing a high cis-1,4-butadiene containing butadiene-piperylene copolymer.

The ratio of organomagnesium compound to titanium tetrahalide falls within the range of 1:1 and 10:1. If the organomagnesium compound is a dihydrocarbyl magnesium compound, the mole ratio of dihydrocarbyl magnesium compound to titanium tetrahalide in the catalyst-forming reaction mixture will ordinarily fall between 1:1 and 5:1 and preferably between 1:1 and 2:1 in order to obtain a high cis-1,4-content of butadiene units in the copolymers of our invention. On the other hand, if the organomagnesium compound is a Grignard reagent, the mole ratio of Grignard reagent to titanium tetrahalide in the reaction mixture will ordinarily fall between 2:1 and 10:1 and preferably between 2:1 and 4:1.

The concentration of catalyst employed in the process of our invention is best expressed in moles of catalyst per mole of diene reactant. In other words, it is the sum of the moles of organomagnesium compound plus the moles of titanium tetrahalide divided by the moles of diene reactant. The broad catalyst concentration can range between 0.00001 and 0.01 mole per mole of diene in the reaction mixture. The preferred catalyst concentration is between 0.00007 mole and 0.0045 mole of catalyst per mole of diene reactant.

As will be obvious to those skilled in the art the normal precautions should be taken to insure that the solvents, monomers and catalyst components are free from impurities which would interfere with the solution polymerization reactions, especially impurities which would poison the catalyst or slow up the polymerization or objectionably contaminate the polymer product. The butadiene and piperylene reactants as well as the inert solvent should be relatively free of moisture, preferably below 10 parts per million. They should also be essentially free from sulfur, carbonyl groups, and peroxides. In addition, the monomers can be freed of inhibitors by passing them through an alumina bed prior to adding them to the polymerization reaction.

A requirement of the process of our invention, in order to obtain copolymer having a high cis content, is that iodine be present in the catalyst system either as elemental iodine or a substituent of the organomagnesium compound or of the titanium tetrahalide. The presence of the iodine in the catalyst system seems to exert a directing influence on the polymerization reaction with the result that the butadiene component of the instant copolymers has a cis-1,4-content of at least 70%.

There are a number of ways to combine and activate the catalyst components used in our process. These ways are disclosed in U.S. Pat. 3,424,736, Nudenberg et al., Jan. 28, 1969, and 3,499,882, Nudenberg et al., Mar. 10, 1970. However the preferred method is to mix the catalyst in situ in the reaction mixture by the separate introduction of the individual catalyst components, that is, the organomagnesium compound and the titanium tetrahalide are added to the reaction mixture containing piperylene and butadiene. In the process of our invention, the conversion of the active catalyst to an inactive reduced state is substantially eliminated.

The polymerization process of the invention is effected at temperatures of from $-10°$ C. to $90°$ C. with temperatures between $0°$ C. and $75°$ C. being preferred. We generally use a temperature in the neighborhood of $25°$ C. The polymerization temperature does not appear to be critical. Because of the stability and temperature insensitivity of the catalyst system employed in this process, it is not necessary to maintain rigid control over temperature during the polymerization. In fact, the reaction can be allowed to exotherm adiabatically, in which case the heat liberated augments the rate of reaction. The polymerization process is usually effected at pressures sufficient to maintain a liquid phase operation. Broadly speaking, pressures between atmospheric and 500 psig (pounds per square inch gauge) may be employed; but pressures between 30 and 100 psig are usually adequate to maintain the liquid phase operation.

The process used in making our copolymers is carried out in a hydrocarbon solvent. The aromatic hydrocarbons such as benzene, toluene, the several xylenes and the like are preferred. However, the saturated aliphatic hydrocarbon solvents such as straight and branch-chain paraffins containing from 3 to 16 carbon atoms such as propane, pentane, hexane, heptane, dodecane, petroleum ether, cyclopentane, cyclohexane, methyl cyclohexane and the like can be used.

The copolymerization reaction can be effected batchwise or in a continuous manner. The usual reaction time for the polymerizations contemplated in this invention can vary from ½ hour to 20 or more hours with the reaction temperature, the catalyst activity, the solvent, and the size of the polymerization reaction mixture all affecting the duration of the reaction. The reaction is continued until 50% or more of the monomers have been converted to polymer after which the reaction is terminated by addition of a catalyst deactivating mixture. A typical reaction terminating solution comprises a benzene solution containing 0.5 to 2.0% of antioxidant per weight of diolefin polymer and 0.2 to 1.5 weight percent secondary amines such as dimethylamine. The antioxidants employed for terminating the reaction are advantageously those which are added to rubber to enhance its antioxidant properties. Examples of antioxidants employed as reaction terminating reagents are N-phenyl-N'-cyclohexyl-p-phenylenediamine, acetone-diphenylamine condensation product, 2,6-di-t-butyl-4-methylphenol, styrenated phenols and 2,2'-methylene bis(4-methyl-6-t-butyl phenol). Another means for terminating the copolymerization reaction involves the addition of $CO_2$ or $NH_3$ to the reaction mixture. Our copolymer is recovered from the reaction mixture by any one of the following conventional methods, e.g., 1. Steam flocculation
2. Precipitation with lower alkanols
3. Solvent evaporation or
4. Conversion to latex and subsequent coagulation.

The following examples will serve to illustrate the practice of the invention in more detail.

EXAMPLE 1

This example serves to illustrate the use of an organomagnesium-titanium tetrahalide catalyst in preparing a butadiene-piperylene copolymer wherein the majority of the butadiene units of our novel copolymer are in the cis-1,4-configuration. The one quart bottle used in this experiment was first dried and purged with nitrogen and then charged with 179 grams of toluene, 24 grams of butadiene and 6.9 grams of piperylene, the charge having been treated earlier to remove oxygen and moisture by nitrogen sparging and azeotropic distillation followed by passing the material through a column of ⅛ inch balls of activated alumina. A total of 0.75 milliequivalent of diphenylmagnesium (added in a toluene solution—0.25 milliequivalent/ml of toluene) and 0.25 millimole of titanium tetraiodide (also added in a toluene solution—.015 millimole/ml of toluene) was then added to the bottle. Polymerization was carried out at $50°$ C. for a total time of 18 hours. The reaction was terminated by the addition of a shortstop composed of methyl alcohol and diethylamine and then stabilized with 1% of N-phenyl-N'-cyclohexyl-p-phenylene diamine. The polymer cement was then alcohol flocced and dried overnight in a vacuum oven at $60°$ C.

The characteristics of the copolymer after polymerization were as follows:

| | |
|---|---|
| % Butadiene | 91 |
| % Cis-1,4 | 87 |
| % Trans-1,4 | 9 |

| -continued | |
|---|---|
| % Vinyl-1,2 | 4 |
| % Piperlyene | 9.1 |
| (Differential Thermal Analysis)-T$_g$ | −107° C |
| Intrinsic Viscosity (in Toluene at 30° C) | 1.63 |
| % Solids | 11.7 |

EXAMPLE 2

This example shows the effect of varying the temperature of polymerization while holding monomer feed constant. As in Example 1, one quart bottles were used. After the bottles were purged with nitrogen they were then charged with 176 grams of toluene, 15 grams of butadiene and 17.3 grams of piperylene, the charge again having been treated earlier to remove oxygen and moisture by nitrogen sparging and azeotropic distillation followed by passing the material through a column of activated alumina (⅛ inch balls). To this charge was added 0.675 milliequivalent of diphenylmagnesium and 0.225 millimole of titanium tetraiodide. In one experiment (run A), polymerization was carried out at 50° C. for 18 hours. In run B, polymerization was carried out at room temperature (25° C.). Both reactions were terminated in the same manner as described in Example 1.

The characteristics of the copolymer are shown in Table I below.

Table I

| Run | A | B |
|---|---|---|
| % Butadiene | 81 | 79 |
| % Cis-1,4 | 79 | 81 |
| % Trans-1,4 | 17 | 16 |
| % Vinyl-1,2 | 4 | 3 |
| % Piperylene | 18.2 | 19.0 |
| T$_g$ | −98 | −98 |
| Intrinsic Viscosity | 1.63 | 2.30 |
| % Solids | 5.2 | 7.0 |

Data show that with the exception of intrinsic viscosity the polymerization temperature has essentially no effect on the physical characteristics of the copolymer within the temperature range investigated.

EXAMPLE 3

This example shows the effect of increasing the catalyst ratio while holding monomer feed consent. Bottles were again used in carrying out the experiments and each bottle was charged with the same amounts of toluene, butadiene and piperylene disclosed in Example 1. In one bottle (run C) was added 0.675 milliequivalent of diphenylmagnesium and 0.225 millimole of titanium tetraiodide. To the second bottle (run D) was added 0.75 milliequivalent of diphenylmagnesium and 0.25 millimole of titanium tetraiodide. Polymerization was carried out for 18 hours at 50° C. The reaction was terminated according to the procedure outlined in Example 1.

The characteristics of the copolymer after polymerization were as follows:

Table II

| Run | C | D |
|---|---|---|
| % Butadiene | 89 | 91 |
| % Cis-1,4 | 87 | 88 |
| % Trans-1,4 | 9 | 8 |
| % Vinyl-1,2 | 4 | 4 |
| % Piperylene | 10.8 | 9.7 |
| T$_g$ | −107 | −107 |
| Intrinsic Viscosity | 1.63 | 1.97 |
| % Solids | 11.0 | 13.0 |

Data show that with the exception of intrinsic viscosity there is essentially no change in the characteristics of the copolymer when the catalyst ratio is increased.

EXAMPLE 4

This example demonstrates a scale-up of the preparation of the butadiene-piperylene copolymer to provide sufficient copolymer for use in a tire compound. In this experiment a 50 gallon reactor was used. After the reactor had been purged with nitrogen it was then charged with 135 kilograms of toluene, 11.5 kilograms of butadiene and 2.5 kilograms of piperylene,—the charge having been treated earlier according to the procedure outlined in Example 1. To this charge was added 291.0 milliequivalents of diphenylmagnesium and 96.7 millimoles of titanium tetraiodide. Polymerization was again carried out at 50° C. and the reaction was terminated after 4 hours using methyl alcohol, water and ammonium hydroxide. The cements were stabilized with 1% N-phenyl-N'-cyclohexyl-p-phenylenediamine and 5% disproportionated rosin (having a specific gravity of 1.060, an acid number of 153, and a saponification number of 150) and then steam flocced and the wet polymer dried in an air oven at 60° C. Analyses of the dried polymer showed piperylene = 9% as determined by NMR, a molecular weight of 255,000, an intrinsic viscosity of 3.84, no insoluble (B) gel, a T$_g$ of −105° C. and a Mooney value (ML-4 at 212° F.) of 83.

EXAMPLE 5

The butadiene-piperylene copolymer prepared in Example 4 (100 parts) was then compounded with 70 parts of an intermediate super abrasion furnace carbon black, 38 parts of an aromatic petroleum hydrocarbon rubber extender oil (specific gravity 0.9806, viscosity 85.7 SUS at 210° F., flash point 435° F., aniline point 116° F.), 3 parts zinc oxide, 1.0 part N-phenyl-N'-isopropyl-p-phenylenediamine antioxidant, 0.5 part petroleum wax (specific gravity 0.92, melting point 62°–65° C.), 1.0 part N-cyclohexyl-2-benzothiazole sulfenamide, 0.3 part diphenylguanidine and 2 parts sulfur. By way of comparison a similar stock was prepared by replacing the butadiene-piperylene copolymer rubber with a rubber blend consisting of 50 parts of a commercial styrene-butadiene rubber (SBR) with a styrene content of about 20 percent and 50 parts of cis-1,4-polybutadiene. In each case all ingredients with the exception of the accelerators and the sulfur were assembled and mixed in the Banbury mixer for 10 minutes. Discharge temperature was 275°–300° F. The accelerators and vulcanizing agent were added on a cool two-roll mill and sheeted off and transferred to the tuber to extrude a tire tread for making a recapped tire.

The recapped tires were cured for 60 minutes at 292° F. and were tested under auxiliary and controlled road testing conditions. The tire tread made from the butadiene-piperylene copolymer rubber showed 14% better tread wear than a tire tread made from the 50/50 mixture of SBR and cis-1,4-polybutadiene.

EXAMPLE 6

This example demonstrates the good low temperature properties of the butadiene-piperylene copolymers when compared with the low temperature properties of cis-1,4-polybutadiene. For this purpose, three stocks were mixed, as shown in Table III, wherein butadiene-piperylene copolymer A (in stock F) contained 13% piperylene and 87% butadiene, while butadiene-piperylene copolymer B (in stock G) contained 18% piperylene and 82% butadiene. The compounding ingredients shown in Table III were as identified in Example 5.

Table II

| Stock | Parts by Weight | | |
|---|---|---|---|
| | E | F | G |
| Cis-1,4-polybutadiene | 100 | — | — |
| Butadiene-piperylene copolymer A | — | 100 | — |
| Butadiene-piperylene copolymer B | — | — | 100 |
| Antioxidant | 1 | 1 | 1 |
| Carbon black | 55 | 55 | 55 |
| Aromatic oil | 5 | 5 | 5 |
| Disproportionated rosin | 5 | 5 | 5 |
| Zinc oxide | 3 | 3 | 3 |
| Stearic acid | 2 | 2 | 2 |
| Accelerator | 1.0 | 1.0 | 1.0 |
| Diphenylguanidine | 0.15 | 0.3 | 0.3 |
| Sulfur | 1.25 | 1.6 | 1.7 |

Each of the stocks of Table III was cured for 60 minutes at 292° F. Table IV shows the results of tests on the cured stocks. In Table IV the hardness is expressed as Shore A, the tensile strength in psi, and the elongation as percent elongation at break. The modulus is expressed in psi, at 300% elongation. The flexometer test was carried out according to ASTM D 623-67, Method A, on the Goodrich Flexometer; the results are expressed as the temperature change in ° F. The rebound was determined according to ASTM 2632-67, at room temperature, and is expressed in percent. The hysteresis is expressed as torsional hysteresis at 200° F. The stiffness values were determined according to the Gehman stiffness test, ASTM D 1053-65, "Procedure for Stiffness Measurements in Liquid Media." The retraction test was carried out according to ASTM D 1329-60.

Table IV

| Physical Properties | Stock | | |
|---|---|---|---|
| | E | F | G |
| Hardness | 62 | 56 | 60 |
| Tensile | 2100 | 1900 | 2175 |
| Elongation | 470 | 510 | 510 |
| Modulus | 985 | 800 | 885 |
| Tensile at 212° F. | 1050 | 1190 | 1140 |
| Elongation at 212° F. | 380 | 420 | 390 |
| Flexometer | 55 | 45 | 46 |
| Rebound | 44 | 52 | 50 |
| Hysteresis | 0.127 | 0.175 | 0.200 |
| Stiffness T2° C. | −33 | −55 | −44 |
| T5 | −38 | — | — |
| T10 | −43 | — | — |
| T100 | — | — | — |
| Reaction TR-10° C. | −57 | <−70 | <−70 |
| TR-70° C. | −27 | −51 | −68 |

EXAMPLE 7

This example demonstrates that butadiene-piperylene copolymer can be prepared containing relatively high amounts of pentadiene as judged by refractive indices.

Table V

| | Run | |
|---|---|---|
| | H | K |
| Benzene (g) | 200 | 200 |
| Butadiene (g) | 40 | 40 |
| Pentadiene (g) | 60 | 100 |

Table V-continued

| | Run | |
|---|---|---|
| | H | K |
| Diphenylmagnesium (meq) | 0.75 | 9.75 |
| Titanium tetraiodide (mm) | 0.25 | 0.25 |
| $N_D^{30}$ | 1.5125 | 1.5088 |
| % Pentadiene | 43 | 62 |

The above polymerization reactions were carried out at 50° C. for 18 hours. Termination of each reaction was carried out according to the procedure outlined in Example 1.

The butadiene-piperylene elastomeric copolymers of the invention are remarkably useful spines for making gum plastics, that is, graft copolymers of resin forming monomers onto the said elastomeric copolymer. For this purpose, the resin-forming monomers conventionally used in making graft copolymers onto butadiene-acrylonitrile copolymer rubber or EPDM rubber, for example, may be employed. These include such monoethylenically unsaturated free-radical polymerizable monomers as the aromatic vinyl monomers, especially styrene (and its equivalents such as the substituted styrenes, e.g., alphamethylstyrene and p-chlorostyrene), alkenoic acids, esters or nitriles such as acrylic acid, methacrylic acid, alkyl acrylates (e.g., ethyl acrylate), alkyl alkacrylates (e.g., methyl methacrylate), acrylonitrile (and its equivalents such as methacrylonitrile), vinyl esters such as vinyl acetate, vinyl ethers such as ethyl vinyl ether, vinyl chloride, vinylpyridine, methyl vinylpyridine, and esters of maleic and fumaric acid (e.g., diethyl fumarate, bis(2,3-dibromopropyl) fumarate). The monomer may be used alone or in combination with one or more other monomers. Additional description of suitable ethylenically unsaturated free radical polymerizable monomers will be found in U.S. Pat. No. 3,271,477, Kresge, Sept. 6, 1966 and U.S. Pat. No. 3,435,096, Limbert et al., Mar. 25, 1969, the disclosures of which are hereby incorporated herein by reference. The proportion of resin forming monomer to butadiene-piperylene rubber spine employed in making the graft copolymer may be as in conventional practice; ordinarily the ratio of resin forming monomers to rubber spine will be within the range of from 10:90 to 90:10 by weight, preferably from 60:40 to 80:20. If desired, the rubber content of the final gum plastic may be adjusted to a desired level by adding additional separately prepared resin to the graft copolymer. The grafting method likewise may be chosen from any of the variety of conventional graft copolymerization procedures. A number of these are referred to in U.S. Pat. No. 3,642,950, O'Shea, Feb. 15, 1972, the disclosure of which is hereby incorporated herein by reference. The resulting graft copolymer has the desirable characteristics of a gum plastic material, useful for making molded objects and the like, and is especially remarkable for its unexpectedly improved low temperature impact strength, as will be manifest from the following example.

EXAMPLE 8

This example demonstrates the use of the novel butadiene-piperylene copolymer (88/12 ratio) of the invention to make a gum plastic having improved low temperature impact strength, by a mass-bead graft copolymerization process (Run L in Table VI). For comparison, a conventional gum plastic based on butadiene-styrene copolymer (95/5 ratio) is also prepared by the same process (Run M in Table VI). The two polymerization recipes are as shown in Table VI expressed in parts by weight. The catalyst in the mass stage was commercial 96–99% active dicumyl peroxide (Di Cup R, trademark); the regulator was "MTM" (mixed tertiary mercaptans). The mass stage was carried out by heating the mixture at 95° C. while agitating for 5 hours in the case of Run L to achieve a conversion of 18% of the monomers, and for 6 hours in the case of run M to achieve a conversion of 20%. The bead stage is then undertaken, using the bead stage product (called a "prepolymer", actually a solution of graft copolymer composition in the unreacted monomers), according to the recipe shown in Table VI. The catalyst in the bead stage is lauroyl peroxide (Alperox C, trademark). The medium for the bead stage is a 0.1% aqueous solution of polyvinyl alcohol. The mix is agitated at 70° C. to achieve a conversion of 91% in both runs L and M. The resulting graft copolymer beads are separated from the reaction mixture, washed and dried. Compression specimens are impact tested according to the notched Izod test (ASTM-D-256-56), at various temperatures with the results shown in Table VI in foot-pounds per inch of notch, from which it will be seen that the gum plastic of the invention (Run L) has remarkably superior impact strength, compared to the prior art gum plastic (Run M).

Table VI

| Run: | Graft Copolymerization | |
|---|---|---|
| | L | M |
| Mass stage | | |
| Butadiene-piperylene copolymer | 10.0 | — |
| Butadiene-styrene copolymer | — | 10.0 |
| Regulator | 0.15 | 0.15 |
| Catalyst | 0.1 | 0.1 |
| Styrene | 63.0 | 63.0 |
| Acrylonitrile | 27.0 | 27.0 |
| Bead Stage | | |
| Prepolymer | 100 | 100 |
| Catalyst | 0.2 | 0.2 |
| Polyvinyl alcohol solution | 200 | 200 |
| Notched Impact Strength | | |
| Room Temp. | 4.5 | 3.6 |
| −20° F. | 3.1 | 1.7 |
| −40° F. | 2.4 | 1.6 |

We claim:

1. A graft copolymer of resin-forming monomeric material onto a spine which is an elastomeric copolymer of butadiene-1,3 and piperylene, the butadiene-1,3 being found in at least 70% cis-1,4-addition and less than 10% vinyl-1,2-addition, said spine copolymer containing from about 5 to about 80 weight percent of piperylene and from about 95 to about 20 weight percent of butadiene, the piperylene units being incorporated in the approximate ratio of $$1,4/1,2 = 2$$

the ratio of resin-forming monomeric material to spine copolymer being within the range of from 60:40 to 80:20 by weight, and the said resin-forming monomeric material being a mixture of styrene and acrylonitrile.

2. A graft copolymer as in claim 1 in which ratio of styrene to acrylonitrile is 63:27 by weight.

* * * * *